US007862912B2

(12) United States Patent
Hellwig et al.

(10) Patent No.: US 7,862,912 B2
(45) Date of Patent: Jan. 4, 2011

(54) PERPENDICULAR MAGNETIC RECORDING MEDIUM AND SYSTEM WITH LOW-CURIE-TEMPERATURE MULTILAYER FOR HEAT-ASSISTED WRITING AND/OR READING

(75) Inventors: Olav Hellwig, San Jose, CA (US); Bruce David Terris, Sunnyvale, CA (US); Jan-Ulrich Thiele, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 455 days.

(21) Appl. No.: 12/041,930

(22) Filed: Mar. 4, 2008

(65) Prior Publication Data

US 2009/0226762 A1 Sep. 10, 2009

(51) Int. Cl.
*G11B 5/66* (2006.01)
(52) U.S. Cl. ............ 428/828.1; 428/827; 428/828
(58) Field of Classification Search ............ 428/828.1
See application file for complete search history.

(56) References Cited

U.S. PATENT DOCUMENTS

| 5,583,727 | A | 12/1996 | Parkin | |
|---|---|---|---|---|
| 5,986,978 | A | 11/1999 | Rottmayer et al. | |
| 6,197,439 | B1 * | 3/2001 | Parkin et al. | 428/678 |
| 6,483,653 | B1 | 11/2002 | Katayama et al. | |
| 6,493,183 | B1 | 12/2002 | Kasiraj et al. | |
| 6,686,070 | B1 | 2/2004 | Futamoto et al. | |
| 6,815,082 | B2 * | 11/2004 | Girt | 428/828.1 |
| 6,830,824 | B2 * | 12/2004 | Kikitsu et al. | 428/828.1 |
| 6,834,026 | B2 | 12/2004 | Fullerton et al. | |
| 6,835,475 | B2 | 12/2004 | Carey et al. | |
| 6,881,497 | B2 | 4/2005 | Coffey et al. | |
| 6,982,844 | B2 | 1/2006 | Rettner et al. | |
| 2005/0243705 | A1 | 11/2005 | Van Kesteren | |
| 2006/0062132 | A1 | 3/2006 | Van Kesteren | |

(Continued)

OTHER PUBLICATIONS

Rosler et al., "Synthetic metamagnetism—magnetic switching of perpendicular antiferromagnetic superlattices", Journal of Magnetism and Magnetic Materials 269 (2004) L287-L291.

(Continued)

*Primary Examiner*—Kevin M. Bernatz
*Assistant Examiner*—Gary Harris
(74) *Attorney, Agent, or Firm*—Thomas R. Berthold

(57) ABSTRACT

A perpendicular magnetic recording medium, usable for either continuous or patterned media, has a recording layer structure (RLS) of first and second perpendicular magnetic layers (PM1, PM2) and an antiferromagnetically coupling (AFC) layer and a ferromagnetic switching layer (SWL) between PM1 and PM2. The magnetic recording system uses heat to assist in the reading and/or writing of data. The SWL is a Co/Ni multilayer with a Curie temperature ($T_{C\text{-}SWL}$) less than the Curie temperatures of PM1 and PM2. At room temperature, there is ferromagnetic coupling between SWL and the upper ferromagnetic layer (PM2) so that the magnetizations of SWL and PM2 are parallel, and antiferromagnetic coupling between SWL and the lower ferromagnetic layer (PM1) across the AFC layer so that the magnetization of PM1 is aligned antiparallel to the magnetizations of SWL and PM2. When the SWL is heated to above $T_{C\text{-}SWL}$ it is no longer ferromagnetic, there is no antiferromagnetic coupling between the SWL and PM1 across the AFC layer, and the magnetizations of PM1 and PM2 become aligned parallel.

21 Claims, 6 Drawing Sheets

U.S. PATENT DOCUMENTS

2006/0068230 A1  3/2006  Faehler
2006/0177704 A1  8/2006  Berger et al.
2007/0212574 A1  9/2007  Berger et al.

OTHER PUBLICATIONS

Meng et al., "Curie temperature dependence of magnetic properties of CoNi/Pt multilayer films", Journal of Magnetism and Magnetic Materials 156 (1996) 296-298.

Hellwig et al., "Separating dipolar broadening from the intrinsic switching field distribution in perpendicular patterned media", Appl. Phys. Lett. 90, 162516 (2007).

"Data Recording at Ultra High Density", IBM Technical Disclosure Bulletin, vol. 39, No. 7, Jul. 1996, p. 237.

"Thermally-Assisted Magnetic Recording", IBM Technical Disclosure Bulletin, vol. 40, No. 10, Oct. 1997, p. 65.

Thiele et al., "FeRh/FePt exchange spring films for thermally assisted magnetic recording media", Appl. Phys. Lett., vol. 82, No. 17, Apr. 28, 2003, pp. 2859-2861.

* cited by examiner

PERPENDICULAR MAGNETIC RECORDING MEDIUM AND SYSTEM WITH LOW-CURIE-TEMPERATURE MULTILAYER FOR HEAT-ASSISTED WRITING AND/OR READING

TECHNICAL FIELD

This invention relates generally to perpendicular magnetic recording media and systems, including patterned recording media and systems, and to thermally-assisted recording (TAR) systems.

BACKGROUND OF THE INVENTION

Perpendicular magnetic recording, wherein the recorded bits are stored in the generally planar recording layer in a generally perpendicular or out-of-plane orientation (i.e., other than parallel to the surface of the recording layer), is a promising path toward ultra-high recording densities in magnetic recording systems, such as hard disk drives. The perpendicular magnetic recording layer is typically a continuous layer on the disk substrate, like in conventional perpendicular magnetic recording disk drives. However, magnetic recording disk drives with patterned perpendicular magnetic recording layers have been proposed to increase data density. In patterned media the perpendicular magnetic recording layer on the disk is patterned into small isolated data islands arranged in concentric data tracks. To produce the magnetic isolation of the patterned data islands, the magnetic moment of the spaces or regions between the data islands is destroyed or substantially reduced to render these regions essentially nonmagnetic. Alternatively, the media may be fabricated so that there is no magnetic material in the regions between the data islands.

A problem associated with continuous perpendicular magnetic recording media is the thermal instability of the recorded magnetization patterns. In continuous perpendicular magnetic recording layers, the magnetic material (or media) for the recording layer on the disk is chosen to have sufficient coercivity such that the magnetized data bits are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_U$) may be required. However, increasing $K_U$ in recording media also increases the switching field, $H_0$, which is proportional to the ratio $K_U/M_S$, where $M_S$ is the saturation magnetization (the magnetic moment per unit volume). The switching field $H_0$ is the field required to reverse the magnetization direction at short time scales on the order of 1 ns relevant for the data rates achieved in modern hard disk drives. For most magnetic media $H_0$ is greater but of similar magnitude than the coercivity or coercive field $H_C$ of the material measured at time scales of 1 s that are easily accessible in magnetometry experiments. $H_0$ cannot exceed the write field capability of the recording head, which currently is limited to about 15 kOe for perpendicular recording.

One approach to addressing this problem is thermally-assisted recording (TAR) using a magnetic recording disk like that described in U.S. Pat. No. 6,834,026 B2, assigned to the same assignee as this application. This disk has a bilayer medium of a high-coercivity, high-anisotropy ferromagnetic material like FePt as the storage or recording layer and a material like FeRh or Fe(RhX) (where X is Ir, Pt, Ru, Re or Os) as a "transition" layer that exhibits a transition or switch from antiferromagnetic to ferromagnetic (AF-F) at a transition temperature less than the Curie temperature of the high-coercivity, high-anisotropy material of the recording layer. The recording layer and the transition layer are ferromagnetically exchange-coupled when the transition layer is in its ferromagnetic state. To write data the bilayer medium is heated above the transition temperature of the transition layer with a separate heat source, such as a laser or electrically resistive heater. When the transition layer becomes ferromagnetic, the total magnetization of the bilayer is increased, and consequently the switching field required to reverse a magnetized bit is decreased without lowering the anisotropy of the recording layer. The magnetic bit pattern is recorded in both the recording layer and the transition layer. When the media is cooled to below the transition temperature of the transition layer, the transition layer becomes antiferromagnetic and the bit pattern remains in the high-anisotropy recording layer.

However, the FeRh or Fe(RhX) transition layer required for this type of TAR must be grown at high temperatures, i.e., greater than 500° C., and is difficult to deposit on the substrate in a manner that assures reliable and repeatable magnetic properties.

A problem associated with patterned perpendicular media is broadening of the switching field distribution (SFD). During the writing of an individual data island, the dipolar interaction of fields from neighboring data islands causes a relatively wide distribution of the switching field, i.e., the write field required to switch the magnetization of the data island from one state to the other state. The SFD broadens (that is, the bit-to-bit variation in the switching field increases) as the size of the data islands is reduced, which limits the achievable data density of patterned perpendicular media.

What is needed is improved perpendicular magnetic recording media, usable for either continuous or patterned media, that takes advantage of heating the recording layer to address the problems of thermal instability and SFD.

SUMMARY OF THE INVENTION

The invention relates to a perpendicular magnetic recording medium and system that uses heat to assist in the reading and/or writing of data. The medium has a recording layer structure (RLS) of first and second ferromagnetic layers (PM1, PM2) with perpendicular magnetic anisotropy and an antiferromagnetically coupling (AFC) layer and a ferromagnetic switching layer (SWL) between PM1 and PM2. The SWL is a multilayer of pairs of alternating films of Co and Ni and has a relatively low Curie temperature ($T_{C\text{-}SWL}$) less than the Curie temperatures of PM1 and PM2. At room temperature (RT), there is ferromagnetic coupling between SWL and the upper ferromagnetic layer (PM2) so that the magnetizations of SWL and PM2 are parallel, and antiferromagnetic coupling between SWL and the lower ferromagnetic layer (PM1) across the AFC layer so that the magnetization of PM1 is aligned antiparallel to the magnetizations of SWL and PM2.

In a first embodiment, heat is applied to the RLS to raise the temperature of SWL above $T_{C\text{-}SWL}$ but below the Curie temperatures of PM1 and PM2 so that SWL is no longer ferromagnetic and thus has substantially no magnetization. There is thus no antiferromagnetic coupling of SWL and PM1 and the magnetization of PM1 becomes aligned parallel with the magnetization of PM2 as a result of the dipole field from PM2. In this state with the temperature of SWL above $T_{C-SWL}$, a write field is applied to the magnetized region to switch the magnetizations of PM2 and PM1. After the SWL has cooled to below $T_{C-SWL}$ the SWL is again ferromagnetic and SWL and PM1 are again coupled antiferromagnetically across AFC layer. However, because the magnetization of PM1 has now been switched as a result of the write field, the magnetizations of SWL and PM2 have also been switched.

In another embodiment the RLS includes a third perpendicular ferromagnetic layer (PM3) below PM1. PM1, the AFC layer, the SWL and PM2 together form a "write assist layer" (WAL) for PM3. PM3 has a coercive field which is preferably greater than the write field. However, the SWL and PM2 have compositions and thicknesses such that the magnetization of PM1 is approximately equal to the sum of the magnetizations of SWL and PM2, so that at RT the SWL is ferromagnetic and the WAL has zero net magnetization. When heat is applied to the RLS to raise the temperature of SWL above $T_{C-SWL}$ but below the Curie temperatures of PM1, PM2 and PM3, the SWL is no longer ferromagnetic and thus has substantially no magnetization. There is thus no antiferromagnetic coupling of SWL and PM1. Because of the dipole field from PM3, the magnetizations of PM2 and PM1 become aligned parallel with the magnetization of PM3. In this state with the temperature of SWL above $T_{C-SWL}$, the write field is then applied. At this elevated temperature, PM3 and the WAL are strongly exchange-coupled ferromagnetically. PM1 and PM2 have coercive fields less than the coercive field of PM3, so that in the presence of the write field the magnetizations of PM1 and PM2 will rotate first and assist in the reversal of the magnetization of PM3, in the manner of an "exchange-spring". After writing and after the magnetized region has cooled to below $T_{C-SWL}$ SWL is again ferromagnetic and PM1 and SWL are again coupled antiferromagnetically across the AFC layer. However, because the magnetization of PM3 has now been switched, the magnetization of PM1 has also been switched and is parallel to magnetization of PM3. In this state the SWL is ferromagnetic, the net magnetization of the WAL is again zero, and the net magnetization of the RSL is essentially just the magnetization of PM3.

In another embodiment the RSL is formed as patterned media with discrete magnetic islands separated by non magnetic regions and heat is applied during reading of the data. Each data island includes a RLS like in the first embodiment. At RT, the SWL is ferromagnetic and the SWL is antiferromagnetically coupled across the AFC layer to PM1, with the result that the magnetizations of SWL and PM2 are aligned antiparallel with the magnetization of PM1 in each data island. By appropriate selection of the materials and thicknesses of PM1, SWL and PM2, the net magnetization of each data island at RT can be kept close to zero or very small, so that there is essentially no effect of the dipole field on neighboring data islands. To read data from a data island, heat is applied to the data island. When the SWL is heated to above $T_{C-SWL}$, it is no longer ferromagnetic, the antiferromagnetic coupling across the AFC layer disappears, and the dipole field from PM1 aligns the magnetization of PM2 to be parallel to the magnetization of PM1. The net magnetization during reading is thus given by the sum of the magnetizations of PM1 and PM2, which results in a strong readback signal. After the data island has been read, the SWL cools to below $T_{C-SWL}$ and becomes ferromagnetic, the SWL becomes antiferromagnetically coupled across the AFC layer to PM1, and the magnetizations of PM1, SWL and PM2 return to their state before reading, i.e., with the net magnetization of the data island again close to zero or very small. In this embodiment, SFD broadening due to dipole field interactions from neighboring data islands is significantly reduced because at RT there is essentially no effect of the dipole field on neighboring data islands.

For a fuller understanding of the nature and advantages of the present invention, reference should be made to the following detailed description taken together with the accompanying figures.

DETAILED DESCRIPTION OF THE INVENTION

Figure 1:
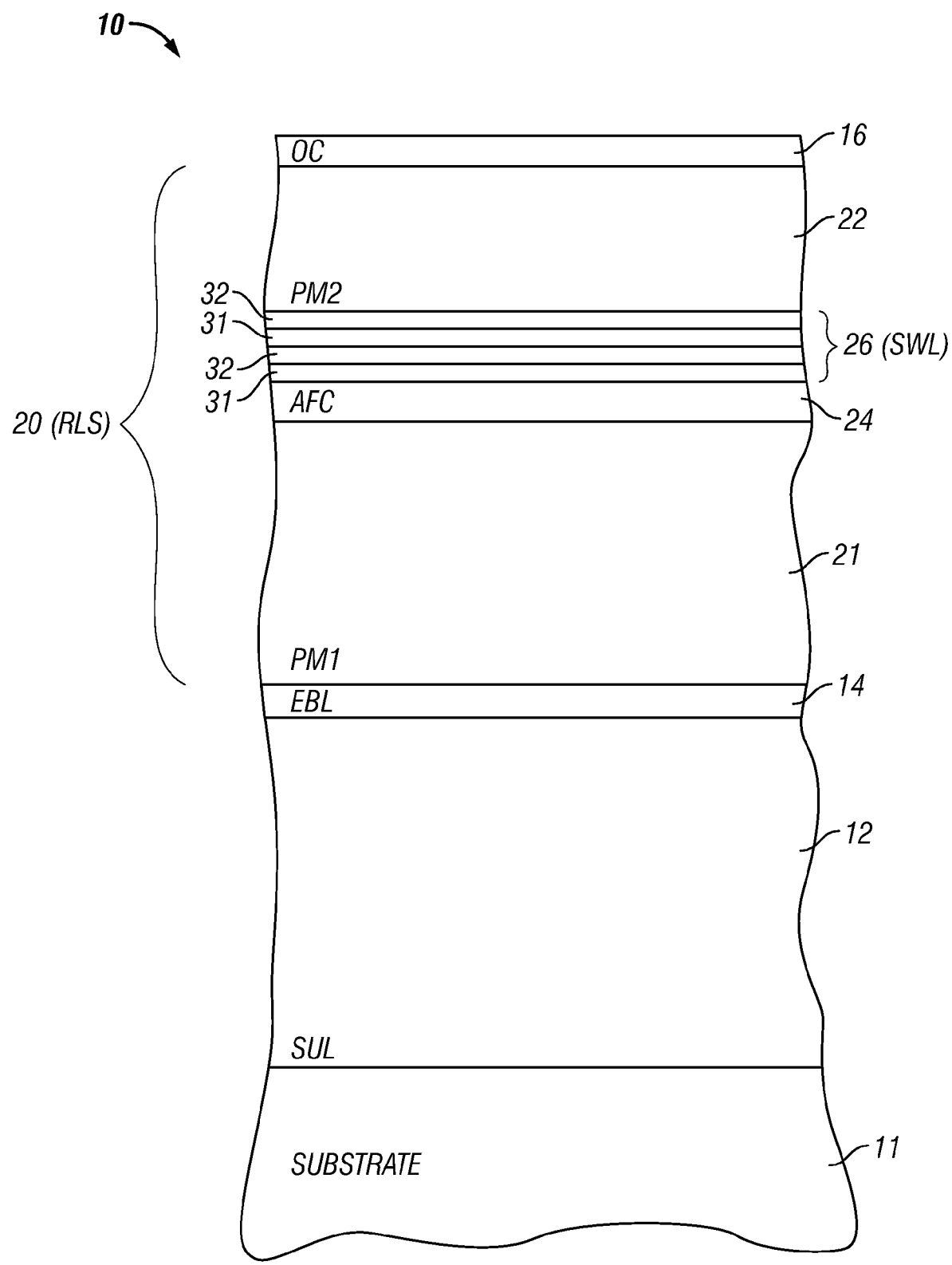
FIG. 1 is a sectional view of one embodiment of the perpendicular magnetic recording medium according to the present invention wherein the recording layer structure (RLS) includes two perpendicular magnetic layers.

FIG. 1 shows a sectional view of the perpendicular magnetic recording medium usable with the system of the present invention. The medium may be a perpendicular magnetic recording disk 10 having the recording layer structure (RLS) 20 of the present invention for use in a disk drive that includes a heat source for heating the disk.

The disk 10 includes the RLS 20 on a disk substrate 11, which may be any commercially available glass substrate, but may also be a conventional aluminum alloy with a NiP surface coating, or an alternative substrate, such as silicon, canasite or silicon-carbide. The disk 10 may also include a "soft" or relatively low-coercivity magnetically permeable underlayer (SUL) 12 on the substrate and a nonmagnetic exchange break layer (EBL) 14 between the RLS 20 and SUL 12. The SUL 12 serves as a flux return path for the field from the write pole to the return pole of the perpendicular recording head and the EBL 14 breaks the magnetic exchange coupling between the RLS 20 and the magnetically permeable SUL 12.

The SUL 12 may be a single layer of magnetically permeable material, as shown in FIG. 1. The SUL 12 may also be a laminated or multilayered antiferromagnetically-coupled SUL formed of at least two soft magnetic films separated by a nonmagnetic interlayer film, such as an interlayer film of Ru, Ir, or Cr or alloys thereof, that mediates an antiferromagnetic coupling. This type of SUL is described in U.S. Pat. No. 6,686,070 B1 and U.S. Pat. No. 6,835,475 B2. However, instead of the antiferromagnetically-coupled SUL, the SUL 12 may be a non-antiferromagnetically-coupled laminated or multilayered SUL that is formed of multiple soft magnetic films separated by nonmagnetic films, such as films of carbon or SiN or electrically conductive films of Al or CoCr. The SUL layer or layers are formed of magnetically permeable materials such as alloys of CoNiFe, CoFeB, CoCuFe, NiFe, FeAlSi, FeTaN, FeN, FeTaC, CoTaZr, CoFeTaZr, and CoZrNb.

The EBL 14 is located on top of the SUL 12. It acts to break the magnetic exchange coupling between the magnetically permeable film of the SUL 12 and. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer to assist the growth of the EBL may be deposited on top of the SUL 12 before deposition of the EBL 14.

The disk 10 also typically includes a protective overcoat (OC) 16 as its outermost surface. The overcoat 16 is typically diamond-like amorphous carbon, but may be any conventional disk overcoat or other known protective overcoat, such as silicon nitride (SiN).

The RLS 20 is located on the substrate 11, more specifically on the optional EBL 14 in the implementation of FIG. 1. The RLS 20 comprises a first ferromagnetic layer with perpendicular magnetic anisotropy (PM1) 21, a second ferromagnetic layer with perpendicular magnetic anisotropy (PM2) 22, an antiferromagnetically coupling (AFC) layer 24 between PM1 and PM2 and a ferromagnetic switching layer (SWL) 26 between PM1 and PM2.

PM1 and PM2 may be formed of any of the known amorphous or crystalline materials and structures that exhibit perpendicular magnetic anisotropy. Thus, PM1 and PM2 may each be a layer of granular polycrystalline cobalt alloy, such as a CoPt or CoPtCr alloy, with or without a suitable segregant such as oxides of Si, Ta, Ti, Nb, Cr, V and B. Also, PM1 and PM2 may each be composed of multilayers with perpendicular magnetic anisotropy, such as pairs of alternating films like Co/Pt, Co/Pd, Co/Ni, Fe/Pt and Fe/Pd multilayers, which may or may not contain a suitable segregant such as the materials mentioned above. In addition, perpendicular magnetic layers containing rare earth elements are useable for PM1 and PM2, such as CoSm, TbFe, TbFeCo, GdFe alloys.

Another material for PM1 and PM2 is chemically-ordered FePt or CoPt (or FePd or CoPd) with its c-axis substantially out-of-plane. Chemically-ordered alloys of FePt, CoPt, FePd, and CoPd (all ordered in $L1_0$) and $CoPt_3$, $CoPd_3$ (both ordered in $L1_2$) in their bulk form, are known for their high magnetocrystalline anisotropy and magnetic moment, properties that are desirable for high-density magnetic recording materials. These chemically-ordered films can be made by several known processes. Films having the $L1_0$ phase of FePt with the c-axis oriented out-of-plane or perpendicular to the substrate, and thus suitable for perpendicular magnetic recording media, have been grown onto a hot substrate by molecular beam epitaxy and by sputter deposition. They can also be formed by alternating the deposition of films of Fe and Pt, followed by annealing, the latter approach being described in U.S. Pat. No. 5,363,794. Other high anisotropy materials suitable for PM1 and PM2 include pseudo-binary alloys based on the FePt and CoPt $L1_0$ phase, i.e., FePt—X and CoPt—X, where the element X may be Ni, Au, Cu, Pd or Ag, as well as granular composite materials such as FePt—C, FePt—ZrO, FePt—MgO, FePt—$B_2O_3$ and other similar composites. While these materials in general have similarly high anisotropy as the binary alloy FePt and CoPt, they allow additional control over the magnetic and structural properties of the media.

The AFC layer 24 is a nonferromagnetic spacer layer formed of ruthenium (Ru), chromium (Cr), rhodium (Rh), iridium (Ir), or copper (Cu), or alloys of these elements. The thickness and composition of AFC layer 24 is chosen so that the magnetizations of the adjacent ferromagnetic layers PM1 and SWL 26 are antiferromagnetically-coupled through the AFC layer 24 and are antiparallel in zero applied field, i.e., the remanent magnetic state. U.S. Pat. No. 6,815,082 describes a perpendicular magnetic recording medium with two ferromagnetic layers, each having perpendicular magnetic anisotropy, separated by an AFC layer that induces perpendicular antiferromagnetic exchange coupling between the two ferromagnetic layers.

SWL 26 comprises a plurality of pairs of alternating films of a first film 31 consisting essentially of Co and Ni and a second film 32 selected from Pt and Pd. By appropriate selection of the Co—Ni composition of the first film 31 and the relative thicknesses of the first and second films in the pair of films, the SWL 26 will have a relatively low Curie temperature ($T_{C-SWL}$). For a CoNi/Pd pair of films, preferably the CoNi first film has a composition of $Co_xNi_{100-x}$, where x is between about 25 and 75 atomic percent, and a thickness in the range of about 1 to 6 Å, and the Pd second film has a thickness in the range of about 3 to 15 Å. By varying the CoNi composition and the relative thicknesses, the SWL can be designed to have a $T_{C-SWL}$ of between RT, i.e., about 20 to 25° C., and 400° C. Specifically, for the present application $T_{C-SWL}$ is selected to be less than the Curie temperature of PM1 ($T_{C-PM1}$) and less than the Curie temperature of PM2 ($T_{C-PM2}$).

Figure 2:
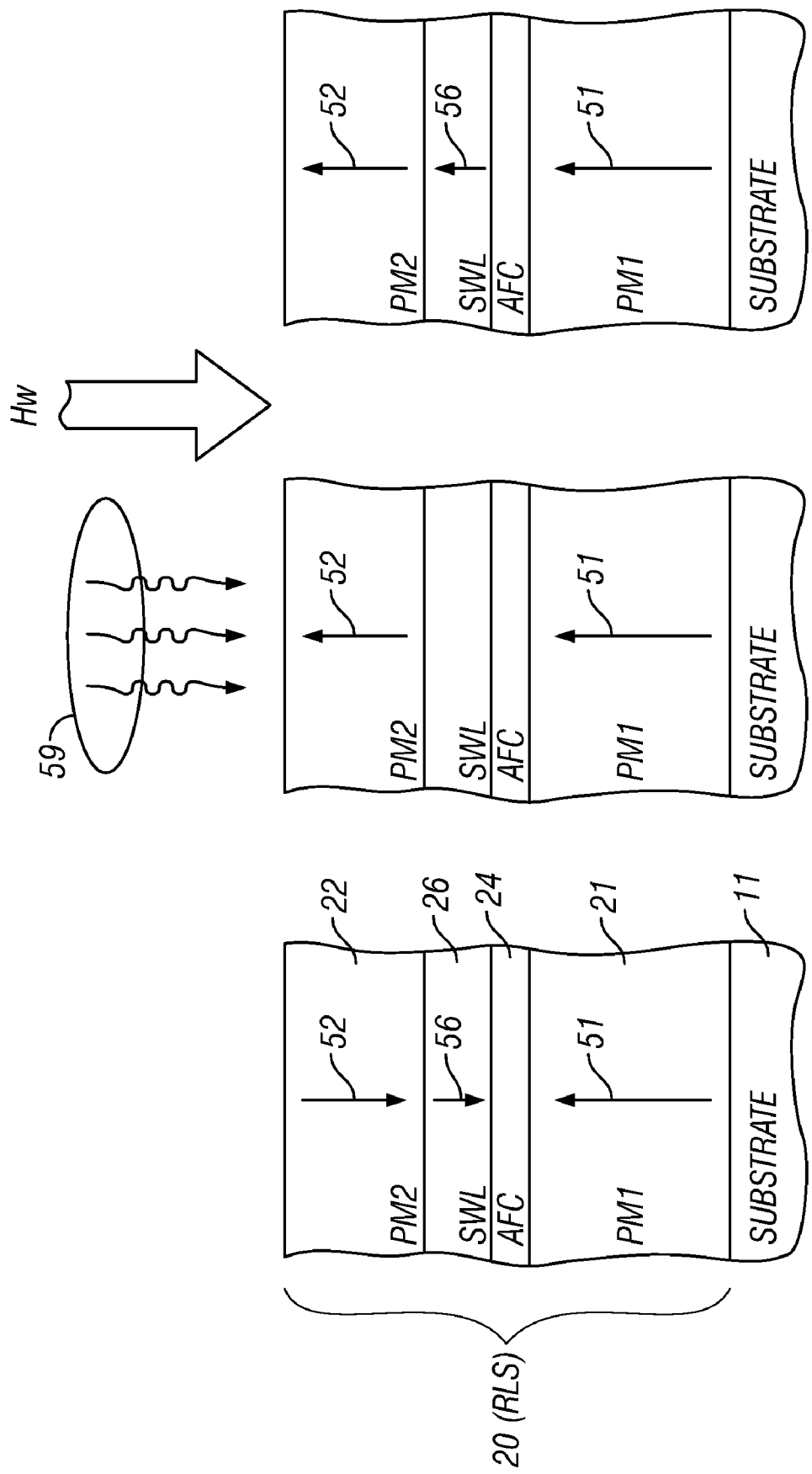
FIGS. 2A-2C illustrate the heat-assisted write process for a magnetized region of the medium of FIG. 1 according to one embodiment of the present invention.

FIGS. 2A-2C illustrate the write process for a magnetized region of a disk according to one embodiment of the present invention. In FIGS. 2A-2C the RLS 20 is illustrated on the disk substrate 11 without a SUL and EBL between the RLS 20 and the substrate 11 and without an OC. FIG. 2A represents one magnetized state when the magnetized region and thus the SWL is at a temperature below $T_{C-SWL}$, for example room temperature (RT) or about 20 to 25° C. In this state the SWL is ferromagnetic with a magnetization 56 of $M_{SWL}*t_{SWL}$, where $M_{SWL}$ is the magnetic moment per unit volume and $t_{SWL}$ the thickness, respectively, of the SWL. In the embodiment of FIGS. 2A-2C, PM1 has a magnetization 51 of $M_{PM1}*t_{PM1}$, where $M_{PM1}$ is the magnetic moment per unit volume and $t_{PM1}$ the thickness, respectively, of PM1. PM1 has a coercive field $H_{C-PM1}$ which is preferably greater than the write field $H_W$ from the disk drive write head. PM2 has a magnetization 52 of $M_{PM2}*t_{PM2}$, where $M_{PM2}$ is the magnetic moment per unit volume and $t_{PM2}$ the thickness, respectively of PM2. Magnetization 52 is less than magnetization 51. PM2 has a coercive field $H_{C-PM2}$ which may be the same or less than $H_{C-PM2}$. As shown in FIG. 2A, at RT, there is ferromagnetic coupling between the SWL and PM2 so that magnetizations 56 and 52 are aligned parallel. However, there is antiferromagnetic coupling between SWL 26 and PM1 across the AFC layer so that magnetization 51 is aligned antiparallel to magnetizations 56 and 52. Because magnetization 51 is greater than (56+52) the direction of net magnetization is "up" or out-of-the-disk in FIG. 2A.

FIG. 2B represents the state when the magnetized region and thus the SWL is at a temperature above $T_{C-SWL}$. This state occurs when heat is applied to the magnetized region by a heat source in the disk drive, as depicted by heat flux lines 59. In this state, the SWL is no longer ferromagnetic and thus has substantially no magnetization. There is thus no antiferromagnetic coupling of SWL and PM1 and magnetization 52 becomes aligned parallel with magnetization 51 as a result of the dipole field from magnetization 52. In this state with the temperature of SWL above $T_{C-SWL}$, the write field $H_W$ is then applied to the magnetized region to switch the magnetization from the state shown in FIG. 2A, as shown by the arrow representing $H_W$ between FIG. 2B and FIG. 2C. The heat has also slightly lowered the coercive fields $H_{C-PM1}$ and $H_{C-PM2}$.

FIG. 2C shows the magnetized regions after writing and after the magnetized region has cooled to below $T_{C-SWL}$, and shows that SWL is again ferromagnetic with magnetization 56. However, because magnetization 51 of PM1 has now been switched to "down" or into-the-disk, PM1 and SWL are again coupled antiferromagnetically across AFC layer and magnetizations 56 and 51 have also been switched. The net magnetization of the magnetized region is again 51−(56+52) but now "down" or into-the-disk.

As an example for the RLS 20 shown in FIGS. 2A-2C, the AFC layer 24 may be 6 Å Ru, and the SWL 26 may be a multilayer of 4 pairs of alternating 2.5 Å $(Co_{50}Ni_{50})$/10 Å Pd films $[2.5 Å (Co_{50}Ni_{50})/10 Å Pd]_4$. For this composition and thicknesses $T_{C-SWL}$ is about 100° C. PM1 may be a multilayer of $[3 Å Co/8 Å Pd]_{14}$ and PM2 may be a multilayer of $[3 Å Co/8 Å Pd]_4$. This results in values for $H_{C-PM1}$ and $H_{C-PM2}$ of about 1 kOe, and 1.5 kOe, respectively. However, by proper choice of deposition parameters the values for $H_{C-PM1}$ and $H_{C-PM2}$ can easily be adjusted to values of several kOe more commonly found in hard disk media. Also, $T_{C-SWL}$ would be about 100° C., which is significantly less than $T_{C-PM1}$ (about 500° C.) and significantly less than $T_{C-PM2}$ (about 500° C.).

Figure 3:
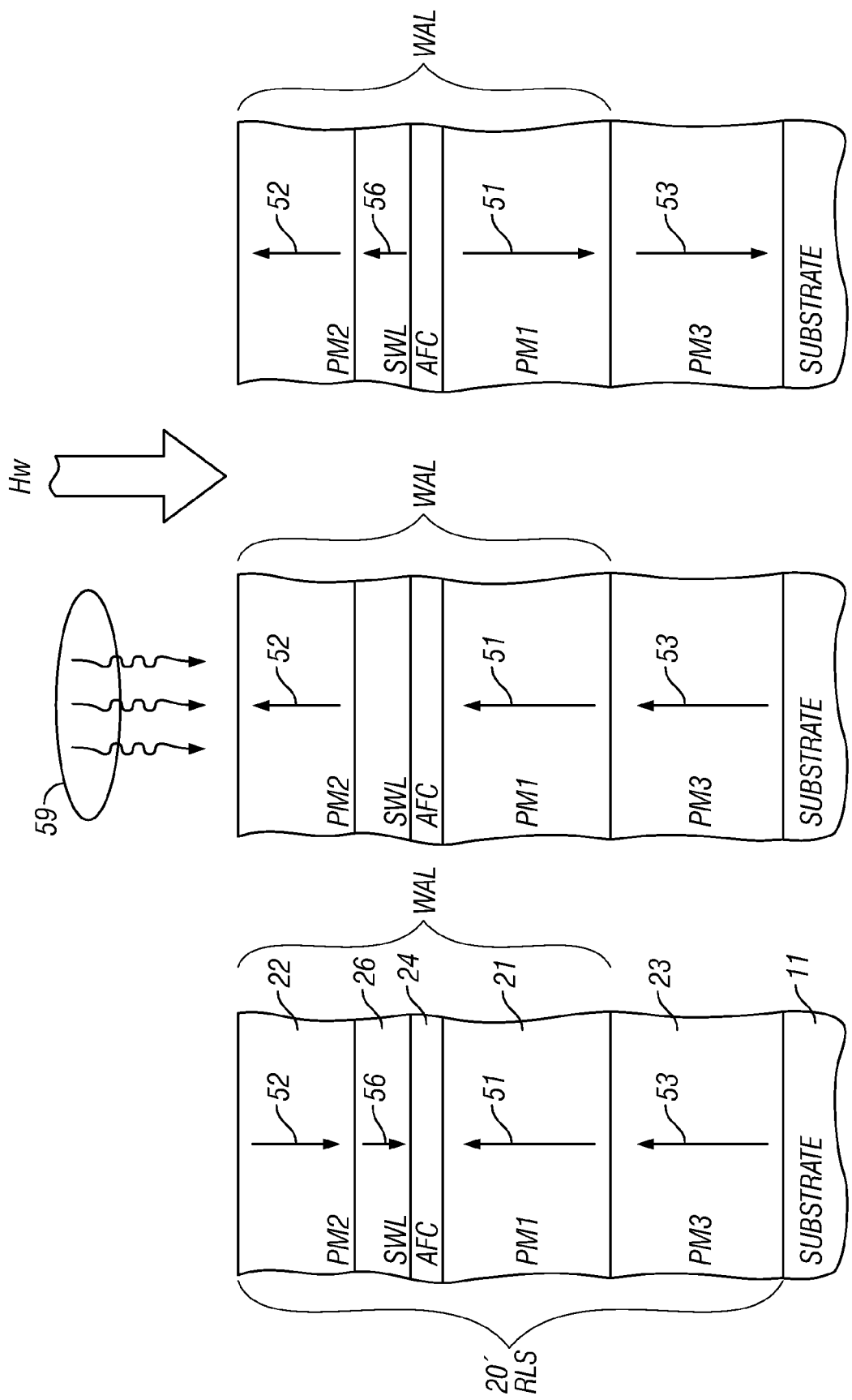
FIGS. 3A-3C illustrate the heat-assisted write process for a magnetized region of another embodiment of the present invention wherein the recording layer structure (RLS) includes three perpendicular magnetic layers.

FIGS. 3A-3C illustrate the write process for a magnetized region of another embodiment of the present invention. In this embodiment the RLS 20' includes a third perpendicular magnetic layer (PM3) 23 located on the substrate below PM1. In FIGS. 3A-3C the RLS 20' is illustrated on the disk substrate 11 without a SUL and EBL between the RLS 20' and the substrate 11 and without an OC. PM1, AFC layer 24, SWL 26 and PM2 together form a "write assist layer" (WAL) for PM3. PM3 may be formed of the same materials or material structures as previously described for PM1 and PM2. PM3 has a magnetization 53 of $M_{PM3}*t_{PM3}$, where $M_{PM3}$ is the magnetic moment per unit volume and $t_{PM3}$ the thickness, respectively, of PM3. PM3 has a coercive field $H_{C-PM3}$ which is preferably greater than the write field $H_W$ from the disk drive write head. However, unlike the embodiment of FIGS. 2A-2C, at RT (FIGS. 3A and 3C), PM1, the SWL and PM2 have compositions and thicknesses such that the magnetization 51 is approximately equal to the sum of the magnetizations 56 and 52, i.e., 51≈(56+52). Thus, at RT the SWL is ferromagnetic and the WAL has zero net magnetization.

FIG. 3A represents one magnetized state when the magnetized region and thus the SWL is at a temperature below $T_{C-SWL}$, for example room temperature (RT) or about 20 to 25° C. In this state the SWL is ferromagnetic, the net magnetization of the WAL is zero, and the net magnetization of the RSL 20' is given by [53+51−(56+52)], which is just the magnetization 53 of PM3 if 51≈(56+52).

FIG. 3B represents the state when the magnetized region and thus the SWL is at a temperature above $T_{C-SWL}$. This state occurs when heat is applied to the magnetized region by a heat source in the disk drive, as depicted by heat flux lines 59. In this state, the SWL is no longer ferromagnetic and thus has substantially no magnetization. There is thus no antiferromagnetic coupling of SWL and PM1. Because of the dipole field from the magnetization 53 of PM3, the magnetizations 52 and 51 become aligned parallel with magnetization 53. In this state with the temperature of SWL above $T_{C-SWL}$, the write field $H_W$ is then applied to the magnetized region to switch the magnetization from the state shown in FIG. 3A, as shown by the arrow representing $H_W$ between FIG. 3B and FIG. 3C. At this elevated temperature, PM3 and the WAL are strongly exchange-coupled ferromagnetically. If PM1 and PM2 have coercive fields less than the coercive field $H_{C-PM3}$ of PM3, then in the presence of a uniform write field $H_W$ the magnetizations 51, 52 will rotate first and assist in the reversal of the magnetization 53 of PM3. This is sometimes called the "exchange-spring" behavior. Published applications US 2006/0177704 A1 and US 2007/0212574 A1, both assigned to the same assignee as this application, describe various exchange-spring type of perpendicular magnetic recording layer structures.

FIG. 3C shows the magnetized region after writing and after the magnetized region has cooled to below $T_{C-SWL}$, and shows that the SWL is again ferromagnetic with magnetization 56 and PM1 and SWL are again coupled antiferromagnetically across the AFC layer. However, because magnetization 53 of PM3 has now been switched to "down" or into-the-disk, the magnetization 51 of PM1 has also been switched and is parallel to magnetization 53 of PM3. In this state the SWL is ferromagnetic, the net magnetization of the WAL is again zero, and the net magnetization of the RSL 20' is just the magnetization 53 of PM3, but is now "down" or into-the-disk.

As an example for the RLS 20' shown in FIGS. 3A-3C, the AFC layer 24 may be 6 Å Ru, and the SWL 26 may be a multilayer of 4 pairs of alternating 2.5 Å $(Co_{50}Ni_{50})$/10 Å Pd films $[2.5 Å (Co_{50}Ni_{50})/10 Å Pd]_4$. For this composition and thicknesses $T_{C-SWL}$ is about 100° C. PM1 may be a multilayer of 6 pairs of alternating Co/Pd films $[3 Å Co/8 Å Pd]_6$, PM2 may be a multilayer of 3 pairs of alternating Co/Pd films $[3 Å Co/8 Å Pd]_3$, and PM3 may be a multilayer of 12 pairs of alternating Co/Pd films $[3 Å Co/8 Å Pd]_{12}$. Alternatively, PM3 may be a single layer of a granular, magnetic material, e.g., the CoPtCr-based alloys that are being used in current perpendicular magnetic recording media. By proper choice of the deposition parameters the values for the coercivities of the various multilayers may be adjusted such that $H_{C-PM1}$ is about equal to $H_{C-PM2}$, and both are significantly lower than $H_{C-PM3}$, which will be adjusted to several kOe or above. Also, $T_{C-SWL}$ would be about 100° C., which is significantly less than $T_{C-PM1}$ (about 500° C.), significantly less than $T_{C-PM2}$ (about 500° C.) and significantly less than $T_{C-PM3}$ (about 500° C. for multilayers, up to about 1000° C. for granular CoPtCr alloys).

In the embodiments shown in FIGS. 1, 2A-2C and 3A-3C, the layers making up the medium are illustrated as continuous films over the entire surface of the disk substrate 11, like in conventional magnetic recording disks. However, magnetic recording hard disk drives with patterned magnetic recording media have been proposed to increase data density. In patterned media the magnetic recording layer on the disk is patterned into small isolated data islands arranged in concentric data tracks. To produce the magnetic isolation of the patterned data islands, the magnetic moment of the spaces between the islands is destroyed or substantially reduced to render these spaces essentially nonmagnetic. Alternatively, the media may be fabricated so that that there is no magnetic material in the spaces between the islands. In the present invention, the layers making up RLS 20 and RLS 20' may also be patterned into discrete data islands to form patterned media.

Figure 4:
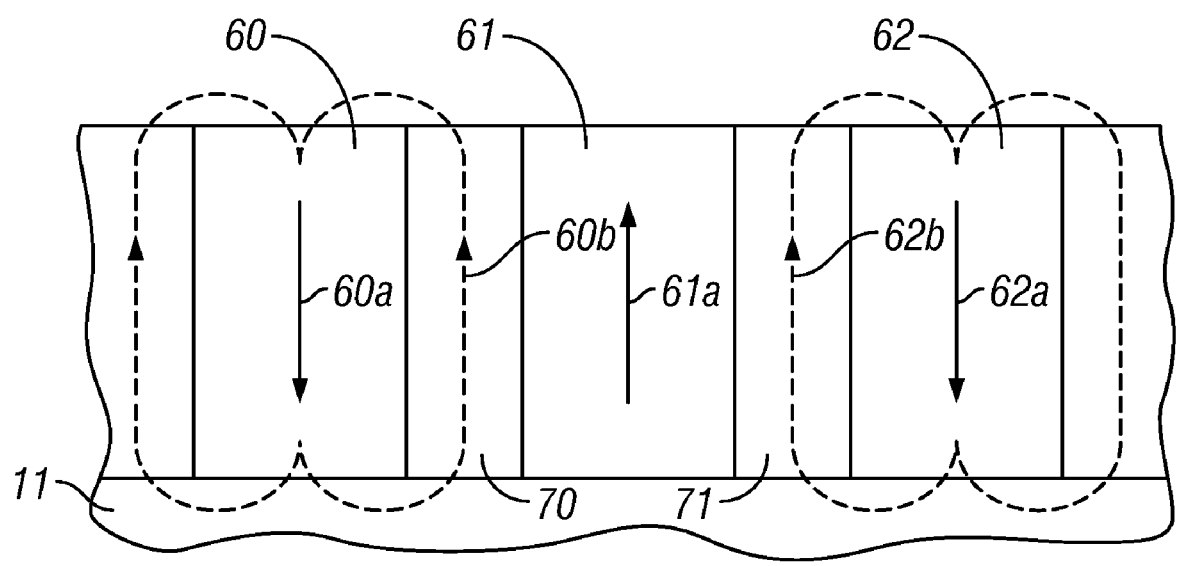
FIG. 4 is a schematic of patterned perpendicular media with discrete spaced-apart data islands for illustrating the problem of switching field distribution (SFD) broadening.

FIG. 4 shows patterned perpendicular media in the form of disk substrate 11 with discrete spaced-apart data islands 60, 61, 62 separated by nonmagnetic regions 70, 71. A problem associated with patterned perpendicular media is broadening of the switching field distribution (SFD). During the writing of a data island, the dipolar interaction of fields from neighboring data islands causes a relatively wide distribution of the switching field, i.e., the write field required to switch the magnetization of a data island from one state to the other state. Ideally the switching field distribution (SFD) width would be zero, meaning that all the bits would switch at the same write field strength. It has been found that the SFD broadens (that is, the bit-to-bit variation in the switching field increases) as the size of the data islands is reduced, which limits the achievable density of patterned perpendicular media. The SFD broadens because of the dipolar interaction between neighboring data islands. This can be understood by reference to FIG. 4. Data island 61 has an "up" magnetization 61a, while neighboring data islands 60, 62 have "down" magnetizations 60a, 62a, respectively. Data island 61 has an intrinsic switching field (closely related to its coercive field $H_C$), which is the field required to switch magnetization 61a from up to down. This switching field must be less than the applied write field $H_W$ from the write head. However, the magnetization 60a produces a dipole field 60b and the magnetization 62a produces a dipole field 62b. These neighboring dipole fields 60b, 62b can affect the switching field of data island 61. In the example of FIG. 4, the dipole fields 60b, 62b are generally parallel to magnetization 61a and would increase the switching field of data island 61. If data neighboring data islands were magnetized in the opposite directions, i.e., if 60a and 62a were down, their respective dipole fields 60b, 62b would be antiparallel to magnetization 61a and would decrease the switching field of data island 61. The problem of SFD broadening due to dipole field interactions from neighboring bits is described by O. Hellwig et al., "Separating dipolar broadening from the intrinsic switching field distribution in perpendicular patterned media", *Appl. Phys. Lett.* 90, 162516 (2007).

Figure 5A:
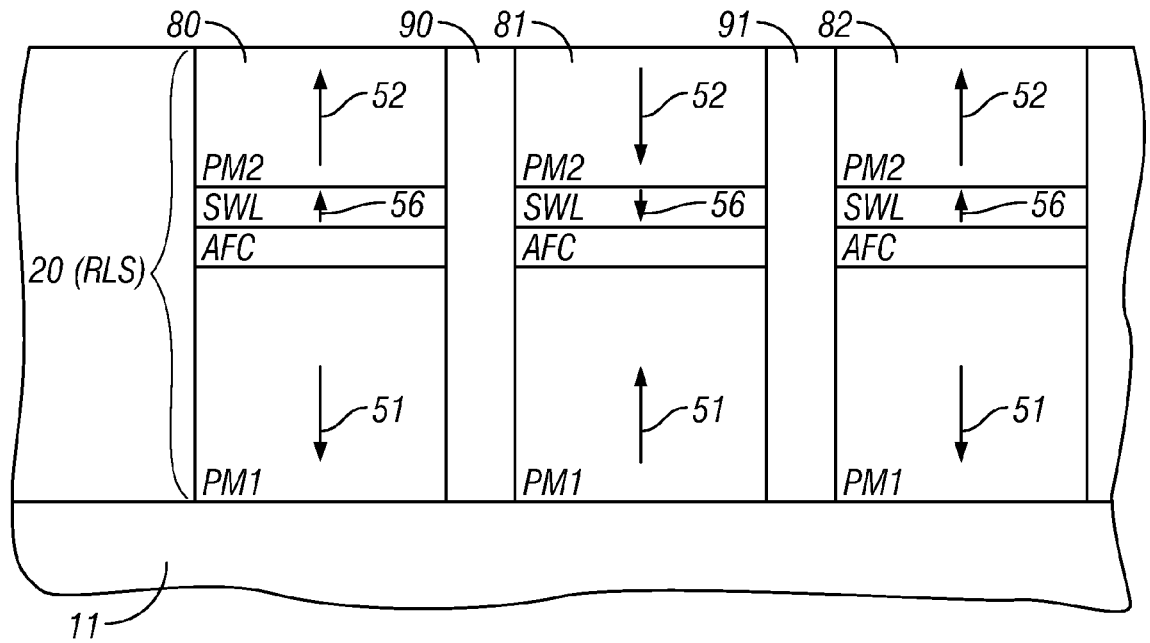
FIGS. 5A-5B illustrate the heat-assisted read process for patterned perpendicular media according to the present invention.
Figure 5B:
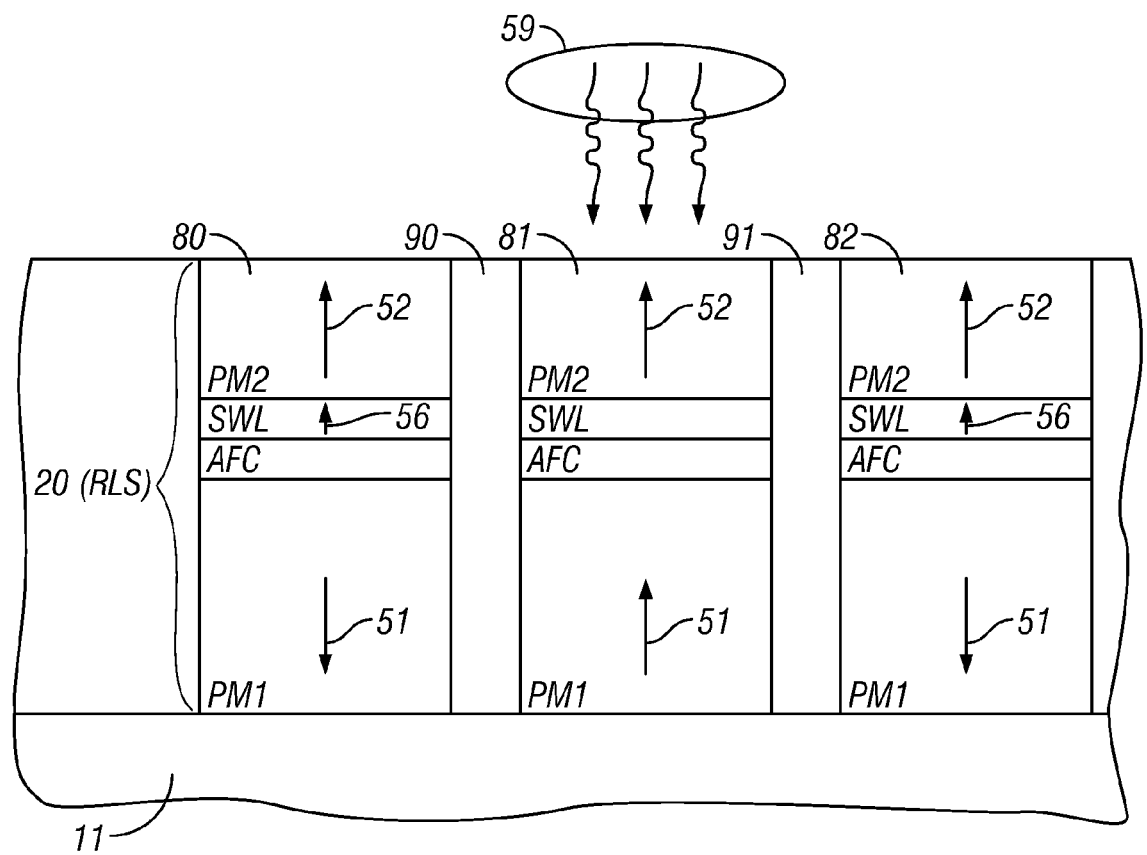

In a patterned media embodiment of the present invention, SFD broadening due to dipole field interactions from neighboring data islands is significantly reduced. FIGS. 5A-5B illustrate this embodiment with discrete data islands 80, 81, 82 separated by nonmagnetic regions 90, 91. Each data island 80, 81, 82 includes a RLS 20, like that described above with respect to FIGS. 2B-2C, but wherein the magnetized data island is heated during reading of the data. As shown in FIG. 5A, at RT, the SWL is ferromagnetic and the SWL is antiferromagnetically coupled across AFC layer to PM1, with the result that magnetizations 52 and 56 are aligned antiparallel with magnetization 51 in each data island 80, 81, 82. The net magnetization of each data island is thus given by [51−(52+56)]. By appropriate selection of the materials and thicknesses of PM1, SWL and PM2, this net magnetization can be kept close to zero or very small, so that there is essentially no effect of the dipole field on neighboring data islands. FIG. 5B illustrates the process to read the data from data island 81. To read data from a data island, i.e., to detect its magnetization, heat is applied to the data island, as shown by heating of data island 81 with heat flux lines 59. When the SWL is heated to above $T_{C-SWL}$, it is no longer ferromagnetic, the antiferromagnetic coupling across the AFC layer disappears, and the dipole field from magnetization 51 aligns magnetization 52 to be parallel to magnetization 51. The net magnetization during reading is thus given by (51+52), which results in a strong readback signal. After the data island 81 has been read, the SWL cools to below $T_{C-SWL}$ and becomes ferromagnetic, and the magnetizations 51, 52, 56 return to the state shown in FIG. 5A for data island 81. In the embodiment of FIGS. 5A-5B, the RLS may be designed with magnetic properties so that heating is not required during writing, i.e., the coercive field $H_{C-PM1}$ of PM1 can be made less than the write field. However, as an optional feature, the RLS in the embodiment of FIGS. 5A-5B may be designed with magnetic properties like the embodiment of FIGS. 2A-2C, i.e., where the coercive field $H_{C-PM1}$ of PM1 is greater than the write field so that heat is also required during the write process. In either case the dipole fields from neighboring data islands will have minimal affect on the switching field of the data island being written.

Figure 6:
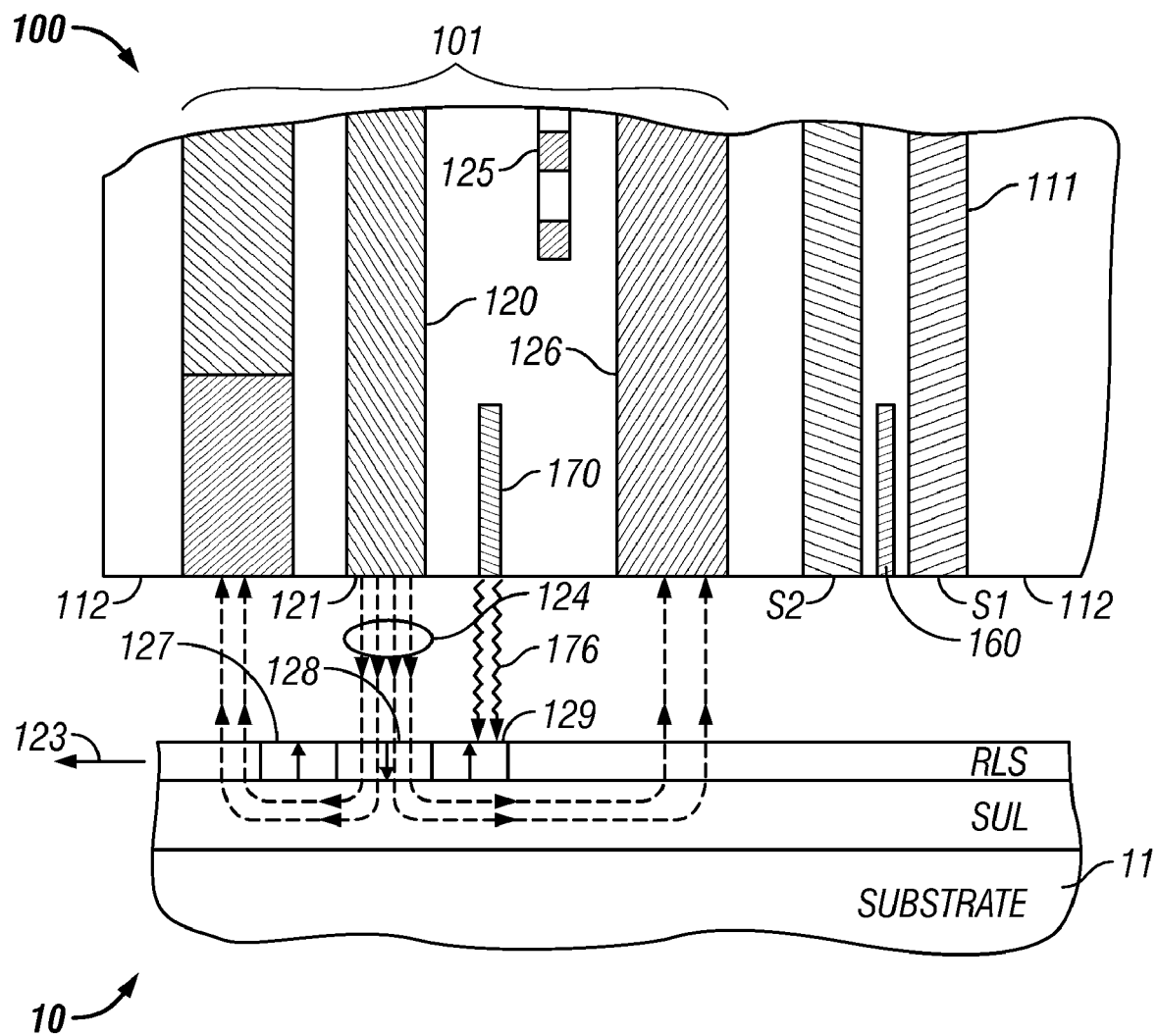
FIG. 6 is a sectional view through a portion of a disk drive head carrier and a disk with the perpendicular magnetic recording medium according to the present invention.

FIG. 6 is a sectional view through a portion of a head carrier 100 and a section of the recording medium, i.e., disk 10, for a perpendicular magnetic recording system according to this invention. The head carrier 100 is shown and described in U.S. Pat. No. 7,068,453 B2, assigned to the same assignee as this application. The disk 10 is depicted with substrate 11, the SUL, and the RLS (either RLS 20 in the embodiment of FIGS. 2A-2C or RLS 20' in the embodiment of FIGS. 3A-3C). This type of system is a TAR system because the RLS is heated during the write process.

The head carrier 100 has a disk-facing surface 112, which is called the air-bearing surface (ABS) if the head carrier is an air-bearing slider, and a trailing surface 111. The surface 111 is called the trailing surface of the head carrier 100 because of the direction 123 of the disk 10 relative to the head carrier 100. The head carrier 100 supports a magnetoresistive read head 160, a perpendicular write head 101 with a main or write pole 120, and a heater 170. The write pole 120 has a pole tip 121. The write pole 120 directs magnetic flux 124 perpendicularly to the RLS, to record or "write" magnetic regions in the data tracks. The transitions between recorded regions (such as regions 127, 128 and 129) represent data bits that are read by the read head 160. The magnetoresistive read head 160 and its shields S1 and S2 can be located on either side of the write head, i.e., the read head and its shields can be fabricated on the trailing surface 111 before or after the write head 101. Surface 111 is located at the end of the head carrier 100 and thus as the disk 10 moves relative to the head carrier 100, the data bits first pass read head 160 and then write pole tip 121. The write head 101 also includes a flux return pole 126 with an end substantially at the recording-layer surface 112, an electrical coil 125 between the write pole 120 and return pole 126, and a trailing shield 131. The head carrier 101 also includes as the heat source an electrically-resistive heater 170 formed of relatively high electrical resistivity material, such as graphite-like carbon, aluminum (Al), chromium (Cr), nichrome (NiCr), tantalum (Ta), or titanium (Ti). The heater 170 is connected to heater control circuitry in the disk drive. The heater 170 has an edge substantially at the recording-layer-facing surface 112.

As the RLS of the disk 10 moves in the direction 123, the heater 170 heats an area of the RLS, as represented by heat flux lines 176. This raises the temperature of the SWL to above $T_{C-SWL}$. A magnetic write field is generated by write current through coil 125 and is directed perpendicularly to the RLS by write pole tip 121, as shown by magnetic flux lines 24. This causes the magnetization of the heated region of the RLS to be switched.

Because the width of the edge of heater 170 is wider than the track-width it is called a "wide-area" heater, meaning that it heats a region of the disk wider than the data track to be recorded. A wide-area heater is relatively easy to implement in a conventional recording head structure and has the additional advantage that it heats the data track very efficiently and thus minimizes the required heater temperature for a given required media temperature. TAR systems with wide-area heaters include systems that use a laser or ultraviolet lamp to do the heating, as described in "Data Recording at Ultra High Density", *IBM Technical Disclosure Bulletin*, Vol. 39, No. 7, July 1996, p. 237; "Thermally-Assisted Magnetic Recording", *IBM Technical Disclosure Bulletin*, Vol. 40, No. 10, October 1997, p. 65; and U.S. Pat. Nos. 5,583,727 and 5,986,978.

One problem with TAR systems that use a wide-area heater is adjacent-track interference (ATI). Because adjacent tracks are also being heated, the stray magnetic field from the write head can erase data previously recorded in the adjacent tracks. A proposed solution for the ATI problem is a "small-area" heater that heats only the data track. U.S. Pat. No. 6,493,183 describes a TAR disk drive wherein the write head includes an electrically resistive heater located in the write gap between the pole tips for locally heating just the data track. U.S. Pat. No. 6,982,844 describes a TAR disk drive that uses an optical channel with an aperture that emits laser radiation to heat just the data track.

In the present invention, for the embodiments wherein the RLS is heated during writing, a TAR system with either a wide-area heater or a small-area heater may be used. This includes the embodiments of FIGS. 2A-2C and 3A-3C, as well as the embodiment of FIGS. 5A-5C if optional heating during writing is implemented.

However, the embodiment of FIGS. 5A-5C requires hearing during reading. The TAR system of FIG. 6 will not work because the heater 170 heats the RLS after the RLS has passed the read head 160. Thus a modified head carrier is required, wherein the heat source, such as heater 170 or a laser-emitting optical channel, is formed between the trailing surface 111 and the shield S1. In this modified disk drive with a heat source for reading, the RLS is heated before it passes the read head 160.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
 a substrate;
 a first ferromagnetic layer (PM1) on the substrate and having perpendicular magnetic anisotropy;
 a second ferromagnetic layer (PM2) on the substrate and having perpendicular magnetic anisotropy;
 an antiferromagnetically coupling (AFC) layer between PM1 and PM2; and
 a ferromagnetic switching layer (SWL) between PM1 and PM2 and having a Curie temperature ($T_{C\text{-}SWL}$) less than the Curie temperature ($T_{C\text{-}PM1}$) of PM1 and less than the Curie temperature ($T_{C\text{-}PM2}$) of PM2, the SWL comprising a plurality of pairs of alternating films of a first film consisting essentially of Co and Ni and a second film selected from Pt and Pd.

2. The medium of claim 1 wherein said first SWL film comprises a $Co_xNi_{100-x}$ alloy wherein x is between about 25 and 75 atomic percent.

3. The medium of claim 2 wherein said first SWL film has a thickness in the range of about 1 to 6 Å and said second SWL film has a thickness in the range of about 3 to 15 Å.

4. The medium of claim 1 wherein $T_{C\text{-}SWL}$ is between about 40 and 100 degrees C.

5. The medium of claim 1 wherein the AFC layer is on PM1 and the SWL is on the AFC layer.

6. The medium of claim 5 wherein PM1 has a coercive field ($H_{C\text{-}PM1}$), PM2 has a coercive field ($H_{C\text{-}PM2}$), and $H_{C\text{-}PM1}$ is greater than $H_{C\text{-}PM2}$.

7. The medium of claim 5 wherein PM1 has a magnetization greater than the magnetization of PM2.

8. The medium of claim 1 further comprising a third ferromagnetic layer (PM3) on the substrate and having a coercive field ($H_{C\text{-}PM3}$); wherein PM1, PM2, the AFC layer and the SWL are on PM3; and wherein $H_{C\text{-}PM3}$ is greater than the coercive field of PM1 ($H_{C\text{-}PM1}$) and greater than the coercive field of PM2 ($H_{C\text{-}PM2}$).

9. The medium of claim 8 wherein PM3 has a magnetization greater than the magnetization of PM1 and greater than the magnetization of PM2.

10. The medium of claim 9 wherein the SWL has a magnetization and wherein the magnetization of PM1 is approximately equal to the magnetization of SWL plus the magnetization of PM2.

11. The medium of claim 1 wherein PM1, PM2, the AFC layer and the SWL are formed as continuous layers on the substrate.

12. The medium of claim 1 wherein PM1, PM2, the AFC layer and the SWL are formed as discrete data islands on the substrate separated by nonmagnetic regions.

13. The medium of claim 1 where one or both or PM1 and PM2 comprises a material selected from the group consisting of (a) a granular polycrystalline Co alloy; (b) a chemically-ordered alloy selected from alloys of FePt, CoPt, FePd, CoPd, $CoPt_3$ and $CoPd_3$; (c) a chemically-ordered $L1_0$ phase alloy selected from FePt—X and CoPt—X, where the element X is selected from the group consisting of Ni, Au, Cu, Pd and Ag; and (d) a multilayer selected from the group consisting of Co/Pt, Co/Pd, Co/Ni, Fe/Pt and Fe/Pd multilayers.

14. A magnetic recording system comprising:
 the medium of claim 1; and
 a heat source for heating a region of the medium to raise the temperature of the SWL to a temperature greater than $T_{C\text{-}SWL}$ but less than $T_{C\text{-}PM1}$ and less than $T_{C\text{-}PM2}$.

15. The system of claim 14 further comprising a write head for generating a magnetic write field to the heated region.

16. The system of claim 14 further comprising a read head for detecting a magnetic field from the heated region.

17. A perpendicular magnetic recording disk drive comprising:
 a perpendicular magnetic recording disk comprising a disk substrate and a recording layer structure (RLS) on the substrate, the RLS comprising
  a first ferromagnetic layer (PM1) having perpendicular magnetic anisotropy;
  a second ferromagnetic layer (PM2) having perpendicular magnetic anisotropy;
  an antiferromagnetically coupling (AFC) layer between PM1 and PM2; and
  a ferromagnetic switching layer (SWL) between PM1 and PM2 and having a Curie temperature ($T_{C\text{-}SWL}$) less than the Curie temperature ($T_{C\text{-}PM1}$) of PM1 and less than the Curie temperature ($T_{C\text{-}PM2}$) of PM2, the SWL comprising a plurality of pairs of alternating films of a first film consisting essentially of Co and Ni and a second film selected from Pt and Pd;
 a heat source for heating a region of the RLS to raise the temperature of the SWL to above $T_{C\text{-}SWL}$;
 a write head for generating a magnetic write field to a region of the RLS; and
 a read head for detecting a magnetic field from a region of the RLS.

18. The disk drive of claim 17 wherein said first SWL film comprises a $Co_xNi_{100-x}$ alloy wherein x is between about 25 and 75 atomic percent, wherein said first SWL film has a thickness in the range of about 1 to 6 Å and said second SWL film has a thickness in the range of about 3 to 15 Å.

19. The disk drive of claim 17 wherein the RLS further comprises a third ferromagnetic layer (PM3) with perpendicular magnetic anisotropy between PM1 and the substrate and having a coercive field ($H_{C-PM3}$); and wherein $H_{C-PM3}$ is greater than the coercive field of PM1 ($H_{C-PM1}$) and greater than the coercive field of PM2 ($H_{C-PM2}$).

20. The disk drive of claim 19 wherein the SWL has a magnetization and wherein the magnetization of PM1 is approximately equal to the magnetization of SWL plus the magnetization of PM2.

21. The disk drive of claim 17 wherein the RLS is patterned as discrete data islands on the substrate separated by nonmagnetic regions.

* * * * *